Oct. 25, 1927.   1,646,822
V. KARAPETOFF
REGULATION OF DYNAMO ELECTRIC MACHINES
Filed Sept. 3, 1925
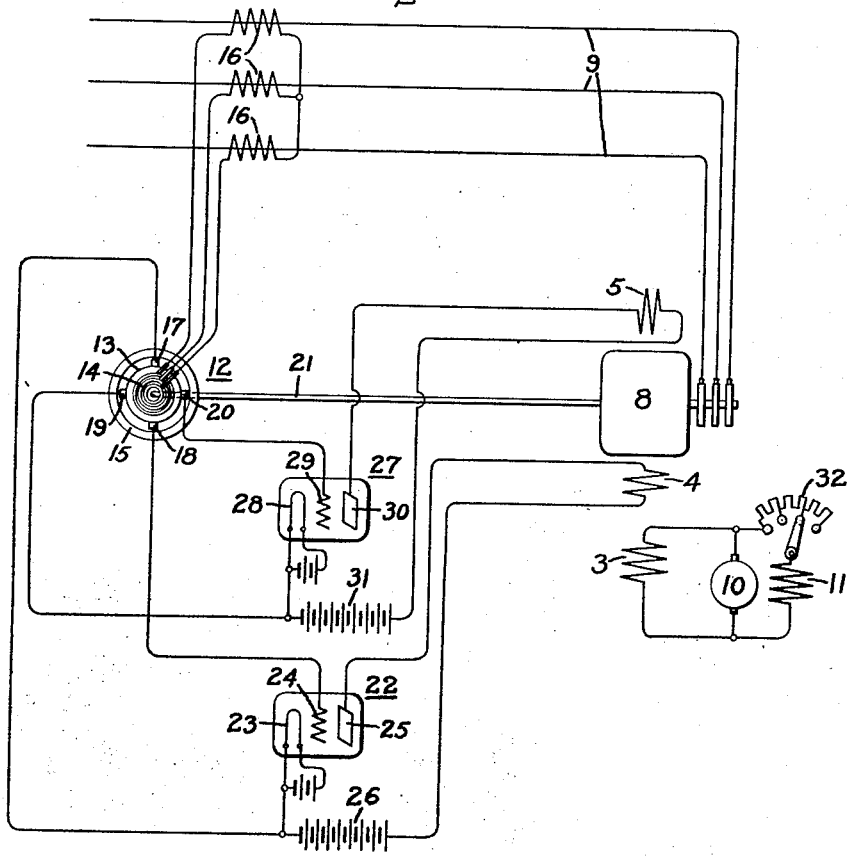
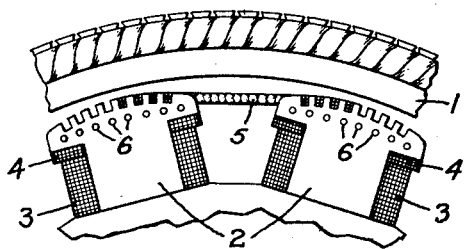
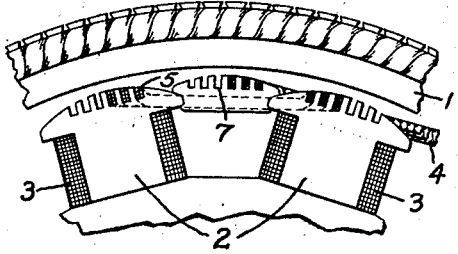
Inventor:
Vladimir Karapetoff,
by
His Attorney.

Patented Oct. 25, 1927.

1,646,822

UNITED STATES PATENT OFFICE.

VLADIMIR KARAPETOFF, OF ITHACA, NEW YORK, ASSIGNOR TO GENERAL ELECTRIC COMPANY, A CORPORATION OF NEW YORK.

REGULATION OF DYNAMO-ELECTRIC MACHINES.

Application filed September 3, 1925. Serial No. 54,378.

My invention relates to the excitation of dynamo-electric machines and in particular to the excitation of synchronous dynamo-electric machines of the salient-pole type and has for its principal object the provision of an improved means whereby the voltage of an alternating-current machine may be maintained substantially constant irrespective of variations in the magnitude and phase of its load current, or if desired may be made to change under various load conditions for effecting any desired degree of compounding. A further object is the provision of an improved arrangement to effect substantially complete neutralization of the two components of the armature reaction of synchronous machines.

When a synchronous machine carries a load, either as a generator or as a motor, the armature currents, being sources of magnetomotive forces, modify and distort the flux created by the field coils and thus influence the performance of the machine. This effect of the armature current in modifying the value of the field flux, referred to as armature reaction, may conveniently be resolved into two components, namely, a direct reaction and a transverse reaction. The one component produces only a "direct" action on the field flux, that is, it either strengthens or weakens the flux without distorting it. The other component produces a "transverse" action, namely, it shifts the flux towards one or the other of the pole tips and may decrease the total flux if the pole tips become saturated.

Merely increasing the alternator field current in the axis of the main poles, as is the usual method in compounded alternators, will not result in a complete neutralization of the armature reaction, since the increase in excitation is applied in the axis of the direct component.

In accordance with my invention, improved means are provided for neutralizing both the direct and transverse components of the total armature reaction of synchronous machines. Preferably, I accomplish this result by providing a neutralizing field, varying substantially simultaneously with the variations in armature current, in the axis of the respective components of the armature reaction. Compensating windings are placed on the field poles near the armature winding of the synchronous machine, with one winding positioned to counteract the direct component of armature reaction and excited by a direct current proportional to the component of the armature current causing the direct reaction, and with another winding positioned to counteract the transverse component of armature reaction and excited by a direct current proportional to the component of the armature current causing the transverse reaction.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which Fig. 1 is a diagrammatic representation of one embodiment of my invention as applied to a three phase synchronous dynamo-electric machine, and Figs. 2 and 3 are illustrative views showing ways in which the compensating windings may be arranged.

Referring to the drawing, in particular Fig. 2, 1 indicates the stator of a synchronous dynamo-electric machine, having a revolving field provided with salient poles 2. The field poles 2 are provided with a main field winding 3 positioned in the usual manner, a compensating winding 4 arranged coaxially with the main winding, and a compensating winding 5 placed in slots in the pole shoes and displaced 90 electrical degrees with respect to the windings 3 and 4. The number of turns in the windings 4 and 5 may be arranged to provide magnetomotive forces equal and opposite to the magnetomotive forces resulting from those components of the armature current causing the direct and transverse reactions respectively. The usual amortisseur winding may be placed in holes 6 below the winding 5 or placed in alternate slots near the surface of the pole shoe.

In Fig. 3, non-magnetic wedges 7 are provided between the poles, partly to serve as an amortisseur winding and partly to provide slots for the compensating winding 4. In this case, both compensating windings are placed on the surface of the rotor. The amortisseur winding may be omitted in view of the non-magnetic wedges, and also because the compensating windings together form a two-phase winding capable of opposing hunting.

In Fig. 1 an illustrative arrangement embodying my invention is shown in connection with a three-phase alternator having an armature 8 supplying a transmission line 9. For purposes of illustration, a revolving-armature type of alternator is shown, but as indicated by the detailed views of the field structure, the revolving-field type of alternator would ordinarily be used as is the usual practice in large-size machines. A direct-current exciter 10 is connected to the main field winding 3 and provided with a field winding 11 having an adjustable resistance 32 in series therewith. The compensating windings 4 and 5 are excited by means of a special type of rotary converter 12 comprising a rotating armature with a commutator 13 and slip rings 14, and an iron stator 15, without polar projections or windings, excited simply by its own armature reaction. The slip rings 14 of the rotary converter are connected to the transmission line 9 through current transformers 16. Two pairs of stationary brushes, 17 and 18, and 19 and 20, bear on the commutator 13. The axes of the two pairs of brushes are shown mutually displaced by 90 electrical degrees, but the displacement angle may be changed to give the best desired results in a given case. The armature of the rotary converter is shown mounted on the alternator shaft 21. It may also be connected by suitable gearing or connected to the alternator in such a manner that electrical phase synchronism may be maintained between the two machines.

Since the brushes of the rotary converter at times may be in a strong magnetic field, there may be a tendency toward serious sparking at the brushes. Hence, the current for the compensating field windings will not necessarily be taken directly from the converter but may be controlled by suitable amplifiers such as the three-electrode space-current devices 22 and 27. With small currents taken from the brushes, narrow hard brushes may be used to facilitate sparkless commutation.

The amplifier 22 is shown as a space-current device of the thermionic type having a cathode 23, a control electrode or grid 24, and an anode or plate 25. The brushes 17 and 18 of the rotary converter are connected to the input terminals of the thermionic tube 22 while the output terminals thereof are connected through a source of electrical energy, such as a battery 26, to the compensating field winding 4. In like manner the amplifier 27 is shown as a space-current device of the thermionic type having a cathode 28, a control electrode or grid 29, and an anode or plate 30. The brushes 19 and 20 of the rotary converter are connected to the input terminals of the thermionic tube 27, while the output terminals thereof are connected through a source of electric energy, such as a battery 31, to the compensating field winding 5.

As is well known in the art, the intensity of the current flow between the cathode and the anode of the thermionic tube depends primarily upon the voltage applied between the anode and cathode, upon the temperature of the cathode, and within certain limits upon the potential of the control electrode with respect to the cathode. Hence, with means for changing the potential of the grid, the current flowing between the cathode and anode may be changed to permit an increase or decrease of current in the compensating windings.

The mode of operation of the arrangement shown in Fig. 1 is as follows: Assume the alternator is brought up to speed by a suitable prime mover (not shown) and is excited by means of the main field winding 3 energized by the exciter 10. The no-load voltage of the alternator may be adjusted by the variable resistance 32 in the field 11 of the exciter 10. Since no load is taken from the lines, the rotary converter 12 will have no voltage across its direct-current brushes and the control electrodes of the thermionic tubes 22 and 27 may be arranged to assume a potential with respect to the cathodes to permit little or no current to flow in the compensating windings. As soon as load current is taken from the alternator, the alternating current transformers 16 are instrumental in energizing the armature of the rotary converter so that a magnetic flux revolving synchronously with respect to the conductors is provided in the armature of the rotary converter. The connections to the armature are made in such a way as to cause the direction of rotation of the flux to be opposite to the direction of rotation of the armature which is rotated in synchronism with the alternator, so that the line of flux remains stationary in space, like in an ordinary rotary converter. The position of the flux with respect to the direct-current brushes depends upon the phase of the alternating current with respect to the pole centers of the alternator. Hence, the brushes may be set so that when the alternating current reaches its maximum under the centers of the poles, the flux in the rotary converter will be in the direction of the brushes 17 and 18. Then the voltage induced between these brushes will be zero while the direct-current voltage between the brushes 19 and 20 will be a maximum. The control electrode 29 of the thermionic tube 27 influenced by the voltage between the brushes 19 and 20 will be arranged to assume a potential with respect to the cathode 28 to allow the desired increase of current in the winding 5. This will give the correct compensation under the conditions assumed, when the direct reaction is zero and the transverse reaction is a maximum.

If the alternating current should lag behind the pole centers by an angle $\psi$, the flux $\phi$ in the rotary converter would be shifted by the same angle, and the voltage induced between the brushes 17 and 18 will be proportional to the component of the armature current $i_d$, which is equal to the armature current times the sine of the angle $\psi$. The voltage induced between the brushes 19 and 20 will be proportional to the component of the armature current $i_t$, which is equal to the armature current times the cosine of the angle $\psi$. The voltages induced between the brushes 17 and 18 will be arranged to control the energization of the auxiliary field winding 4, while the voltage induced between the brushes 19 and 20 will be arranged to control the energization of the auxiliary field winding 5, and thereby correct compensation for the two components of armature reaction will be obtained within the values of output current and power factor that may actually occur. The number of turns in the windings 4 and 5 may be chosen to provide not only compensating fluxes to neutralize the components of the armature reaction, but to provide additional fluxes to compensate for the drop in voltage occasioned by the armature impedance, or may provide for any degree of compounding that may be found desirable.

It will be observed that the resolution of the alternator current into its components is obtained with respect to the pole centers of the alternator and eliminates the discrepancy, due to the variable internal angle of the machine, which arises when the resolution is obtained with respect to the terminal voltage of the alternator. Substantially correct compensation is thereby obtained at any value of current and power factor. The absence of auxiliary apparatus with highly inductive windings will permit a quick response to changing load current so that the compensation will occur substantially simultaneously with a change in load current. The reactance of the armature of the rotary converter is coupled through the transformers 16 with the main line, so that changes in the converter flux are strictly simultaneous with changes in the line current. Thus, the converter acts partly as a current-limiting reactor and prevents very rapid changes in the main current.

While I have shown and described a particular embodiment of my invention as applied to an alternating-current generator, it will be apparent to those skilled in the art that it is applicable to other synchronous dynamo-electric machines, such as synchronous motors, and I, therefore, aim in the appended claims to cover all such changes and modifications as fall within the true spirit and scope of my invention.

What I claim as new and desire to secure by Letters Patent of the United States is:

1. The combination of an alternating-current dynamo-electric machine provided with an exciting winding, means for energizing said exciting winding, means for producing a direct current voltage varying as the sine of the phase angle between the polar axes of the exciting winding and the maximum value of the load current of said alternating-current dynamo-electric machine, and means for complementing the excitation of said exciting winding in accordance with the variations of said direct-current voltage.

2. The combination of an alternating-current dynamo-electric machine provided with an exciting winding and a compensating winding, means for producing a direct-current voltage varying as the cosine of the phase angle between the polar axes of the exciting winding and the maximum value of the load current of said alternating-current dynamo-electric machine, and means for energizing said compensating winding in accordance with the variations of said direct-current voltage.

3. The combination of an alternating-current dynamo-electric machine provided with an exciting winding and a compensating winding, means for energizing said exciting winding, means for producing direct-current voltages varying respectively as the sine and cosine of the phase angle between the polar axes of the exciting winding and the maximum value of the load current of said alternating-current dynamo-electric machine, and means for influencing the energization of said exciting winding and said compensating winding in accordance with the variations in said direct-current voltages to vary the excitation of said dynamo-electric machine substantially simultaneously with the variation in said load current.

4. The combination of an alternating-current dynamo-electric machine provided with main and auxiliary field windings, means for energizing said main field winding, a rotary converter with an unwound stator arranged to be operated in synchronism with said alternating-current machine, means responsive to the load current of the alternating-current machine interconnecting the alternating current side of said converter and said alternating-current machine, and means for energizing said auxiliary field winding in accordance with variations in the direct-current voltage of said rotary converter to neutralize the direct component of the armature reaction of said alternating-current machine.

5. The combination of an alternating-current dynamo-electric machine provided with main and auxiliary field windings, means for energizing said main field winding, a rotary converter with an unwound stator arranged to be operated in synchronism with said alternating current machine, means responsive to the load current of said alternating current machine interconnecting the alternating-current side of said converter and said alternating-current machine, and means for energizing said auxiliary field winding in accordance with variations in the direct-current voltage of said rotary converter to neutralize the transverse component of the armature reaction of said alternating-current machine.

6. The combination of an alternating-current dynamo-electric machine provided with main and auxiliary field windings, means for energizing said main field winding, a rotary converter with an unwound stator arranged to be operated in synchronism with said alternating-current machine, means responsive to the load current of said alternating-current machine interconnecting the alternating current side of said rotary converter and said alternating-current machine, and means for energizing said auxiliary field windings in accordance with variations in the direct current voltage of said rotary converter to neutralize the direct and transverse components of the armature reaction of said alternating-current machine.

7. The combination of an alternating-current dynamo-electric machine provided with a main field winding, a direct current exciter connected to said main field winding, an auxiliary field winding arranged co-axially with said main field winding, a second auxiliary field winding displaced 90 electrical degrees from the axis of said main field winding, a rotary converter with an unwound stator arranged to be rotated in synchronism with said alternating-current machine, means connecting the alternating-current side of said rotary converter in series relation with said alternating-current machine, means responsive to a voltage from the direct-current side of said rotary converter to vary the energization of said first mentioned auxiliary field winding substantially simultaneously with the variations in that component of the armature current causing a direct armature reaction in said alternating-current machine, and means responsive to a voltage from the direct-current side of said rotary converter to vary the energization of said second auxiliary winding substantially simultaneously with variations in that component of the armature current causing a transverse armature reaction in said alternating-current machine.

8. The combination of an alternating-current dynamo-electric machine provided with an exciting winding, a direct-current exciter connected to said exciting winding, a rotary converter connected in series relation with said dynamo-electric machine and arranged to be operated in synchronism therewith for producing a direct current voltage varying as the sine of the phase angle between the polar axes of said exciting winding and the maximum value of the load current of said alternating-current dynamo-electric machine, and a space current device interconnecting said rotary converter and said exciting winding for complementing the excitation of said exciting winding in accordance with the variations of said direct-current voltage.

9. The combination of an alternating-current dynamo-electric machine provided with an exciting winding and a compensating winding, a direct-current exciter connected to said exciting winding, a rotary converter connected in series relation with said dynamo-electric machine and arranged to be operated in synchronism therewith for producing a direct-current voltage varying as the cosine of the phase angle between the polar axes of the exciting winding and the maximum value of the load current of said alternating-current dynamo-electric machine, and a space current device interconnecting said rotary converter and said compensating winding to vary the energization of said compensating winding in accordance with the variation in said direct-current voltage.

10. The combination of an alternating-current dynamo-electric machine provided with an exciting winding and a compensating winding, a direct-current exciter connected to said exciting winding, a rotary converter connected in series relation with said alternating-current dynamo-electric machine and arranged to be operated in synchronism therewith for producing direct current voltages varying respectively as sine and cosine of the phase angle between the polar axes of the exciting winding and the maximum value of the load current of said dynamo-electric machine, and space current devices responsive to said direct-current voltages interconnecting said rotary converter and said exciting and compensating windings to vary the excitation of said alternating-current dynamo-electric machine substantially simultaneously with the variations in said load current.

11. The combination of an alternating-current dynamo-electric machine provided with main and auxiliary windings, means for energizing said main field winding, a rotary converter with an unwound stator arranged to be operated in synchronism with said alternating-current machine, means responsive to the load current of said alternating current machine interconnecting the alternating-current side of said rotary converter and said alternating-current machine, and a space-current device connected to the direct-current side of said rotary converter and to said auxiliary field winding for controlling the energization thereof to neutralize the direct component of the armature reaction of said alternating-current machine.

12. The combination of an alternating-current dynamo-electric machine provided with main and auxiliary field windings, means for energizing said main field winding, a rotary converter with an unwound stator arranged to be operated in synchronism with said alternating current machine, means responsive to the load current of said alternating-current machine interconnecting the alternating-current side of said rotary converter and said alternating-current machine, and a space current device connected to the direct-current side of said rotary converter and to said auxiliary field winding for controlling the energization thereof to neutralize the transverse component of the armature reaction of said alternating-current machine.

13. The combination of an alternating-current dynamo-electric machine provided with main and auxiliary field windings, means for energizing said main field winding, a rotary converter wtih an unwound stator arranged to be operated in synchronism with said alternating current machine, means responsive to the load current of said alternating-current machine interconnecting the alternating-current side of said rotary converter and said alternating-current machine, and space current devices connected to the direct-current side of said rotary converter and said auxiliary field windings for controlling the energization thereof to neutralize the direct and transverse components of the armature reaction of said alternating-current machine.

14. The combination of an alternating-current dynamo-electric machine provided with a main field winding, a direct-current exciter connected to said main field winding, an auxiliary field winding arranged coaxially with said main field winding, a second auxiliary field winding displaced 90 electrical degrees from the axis of said main field winding, a rotary converter with an unwound stator arranged to be rotated in synchronism with said alternating-current machine, means connecting the alternating-current side of said rotary converter in series relation with said alternating-current machine, a space current device responsive to a voltage from the direct-current side of said rotary converter to vary the energization of said first mentioned auxiliary field winding substantially simultaneously with variations in that component of the armature current causing a direct armature reaction in said alternating-current machine, and a space current device responsive to a voltage form the direct current side of said rotary converter to vary the energization of said second auxiliary field winding substantially simultaneously with the variations of that component of the armature current causing a transverse armature reaction in said alternating-current machine.

In witness whereof, I have hereunto set my hand this 1st day of September, 1925.

VLADIMIR KARAPETOFF.

Certificate of Correction.

Patent No. 1,646,822.     Granted October 25, 1927, to

VLADIMIR KARAPETOFF.

It is hereby certified that error appears in the printed specification of the above-numbered patent requiring correction as follows: Page 4, line 121, claim 11, after the word "auxiliary" insert the word *field;* page 5, line 63, claim 14, for the word "form" read *from;* and that the said Letters Patent should be read with these corrections therein that the same may conform to the record of the case in the Patent Office.

Signed and sealed this 6th day of December, A. D. 1927.

[SEAL.]
M. J. MOORE,
*Acting Commissioner of Patents.*